(12) United States Patent
Kenmotsu et al.

(10) Patent No.: US 7,040,669 B2
(45) Date of Patent: May 9, 2006

(54) FUEL FEEDING PIPE

(75) Inventors: Toru Kenmotsu, Soja (JP); Hiroshi Yoshida, Soja (JP); Hiroshi Goto, Soja (JP)

(73) Assignee: Asteer Co., Ltd., Okayama (JP)

( * ) Notice: Subject to any disclaimer, the term of this patent is extended or adjusted under 35 U.S.C. 154(b) by 345 days.

(21) Appl. No.: 10/691,072

(22) Filed: Oct. 22, 2003

(65) Prior Publication Data
US 2004/0084094 A1 May 6, 2004

(30) Foreign Application Priority Data
Nov. 1, 2002 (JP) ............................. 2002-320418

(51) Int. Cl.
*F16L 25/00* (2006.01)
*F16K 15/03* (2006.01)

(52) U.S. Cl. .................. 285/332.2; 285/351; 220/86.2; 137/515.3

(58) Field of Classification Search ............... 137/515, 137/515.3; 220/86.2; 285/332.2, 351
See application file for complete search history.

(56) References Cited

U.S. PATENT DOCUMENTS

| | | | | |
|---|---|---|---|---|
| 612,414 | A * | 10/1898 | Hall | 137/515.3 |
| 2,413,730 | A * | 1/1947 | Samiran | 285/351 |
| 2,779,498 | A * | 1/1957 | Cole et al. | 220/86.2 |
| 3,348,863 | A * | 10/1967 | Rinker | 285/351 |
| 3,482,859 | A * | 12/1969 | Bowlin | 285/332.3 |
| 3,836,182 | A * | 9/1974 | Miller | 285/114 |
| 4,652,023 | A * | 3/1987 | Timmons | 285/93 |
| 4,774,981 | A * | 10/1988 | Mizusawa | 137/515 |
| 4,995,433 | A * | 2/1991 | Beicht et al. | 220/86.2 |
| 5,159,953 | A * | 11/1992 | Sato et al. | 137/515 |
| 5,172,721 | A * | 12/1992 | Sato et al. | 137/515 |
| 5,222,519 | A * | 6/1993 | Sato et al. | 137/515 |
| 6,305,408 | B1 | 10/2001 | Goto et al. | |
| 6,619,343 | B1 * | 9/2003 | Stoddart et al. | 220/86.2 |

FOREIGN PATENT DOCUMENTS

| | | |
|---|---|---|
| JP | 5-42893 | 10/1993 |
| JP | 7-127783 | 5/1995 |
| JP | 2566279 | 10/1996 |
| JP | 11-48801 | 2/1999 |
| JP | 2001-97054 | 4/2001 |
| JP | 2001-191802 | 7/2001 |

* cited by examiner

*Primary Examiner*—John Rivell
(74) *Attorney, Agent, or Firm*—Koda & Androlia (57) ABSTRACT

A fuel feeding pipe having a first feed oil pipe extending from an oil filler port, a second feed oil pipe projecting from a fuel tank, and a tightening belt for connecting and tightening these oil pipes together, comprising an outer fitting pipe provided to the first feed oil pipe, and an inner fitting portion provided to the second feed oil pipe having low-temperature resisting and ozone resisting seal rings fitted therearound. The fuel feeding pipe is formed in one body by fitting the outer pipe around the inner fitting portion having the seal rings, then tightening the tightening belt fitted over at least the engaged region of the outer fitting pipe and the inner fitting portion. The invention achieves the minimization of a fuel permeation, high hermeticity without influences from various environments, the promotion of efficiency of replacement operation, and the vibration and impact resisting connection of the pipes.

3 Claims, 8 Drawing Sheets

FUEL FEEDING PIPE

BACKGROUND OF THE INVENTION

1. Field of the Invention

This invention relates to a fuel feeding pipe formed by connecting together a first feed oil pipe which is a conduit extending from an oil filler port of an automobile and a second feed oil pipe which is a conduit projecting from a fuel tank.

2. Prior Art

General fuel feeding pipes for an automobile have been formed by manufacturing separately a conduit (hereinafter defined as a first feed oil pipe) extending from an oil filler port and a conduit (hereinafter defined as a second feed oil pipe) projecting from a fuel tank, and then connecting the resultant two feed oil pipes together during an installation process of the feed oil pipes to a vehicle body. In this fuel feeding pipe, the first and second oil pipes are connected together via a rubber or a resin pipe for the purpose of setting free the arrangement relation between the two feed oil pipes and of preventing the influence of vibrations of the fuel tank from being exerted on the first feed oil pipe. However, this rubber or resin pipe has the property of permeating fuel vapor through a wall thereof, and causes atmospheric pollution to occur. Therefore, in recent years, a fuel feeding pipe formed by directly connecting first and second feed oil pipes together without using a rubber or resin pipe has been proposed. For example, in the inventions disclosed in JP-A-2001-191802, JP-A-11-048801 and Japanese Patent No. 2566279, a second feed oil pipe is not provided, and a flange provided on an end portion of a first feed oil pipe is connected in a surface contacting state to a fuel tank. On the other hand, in the inventions disclosed in JP-A-2001-097054, JP-B-05-042893, JP-A-07-127783 and U.S. Pat. No. 6,305,408, first and second feed oil pipes are connected together by a metal joint.

However, the fuel feeding pipes described above have the following problems.

First, the case of the fuel feeding pipe formed by connecting the flange provided on an end portion of the first feed oil pipe to the fuel tank in a surface contacting state will be described. Since it becomes necessary that a packing is provided between the flange and fuel tank so as to secure hermeticity thereof, the durability of the packing becomes a problem. In addition, a whirl-stop member, such as a spring washer for preventing the loosening of the packing also becomes necessary, and this causes an increase in the number of parts and the number of assembling processes. Moreover, due to the structure for fixing the first feed oil pipe to the fuel tank, the transferring of the first feed oil pipe to an assembly line when a specially long first feed oil pipe is used is rendered difficult, and the replacement of parts of the first feed oil pipe also becomes difficult.

Next, the case where the first and second feed oil pipes are connected together by a metal joint will now be described. In this case, it is necessary to use a joint neither loosened nor coming off even when the vibrations of an automobile occur. The loosening and separation of the joint causes the leakage of a fuel and in its turn the ignition of the fuel. However, the use of a solid joint in which neither the loosening nor the separation thereof occurs causes an increase in the number of parts and the number of assembling processes, and, moreover, renders the replacement of parts difficult.

In view of the above, therefore, the inventors of the invention have investigated to develop a fuel feeding pipe connected to a fuel tank of an automobile, which attains (1) the satisfaction of a basic demand for the minimization of the permeation of a fuel through the wall of the pipe, (2) the convenient replacement of parts based on the easily removable pipe, (3) the securing of the necessary and sufficient hermeticity of the pipe in various kinds of environments, and (4) the prevention of the loosening and separation, which are ascribed to the vibrations and collision of an automobile, of a connecting portion of the pipe.

SUMMARY OF THE INVENTION

The present invention relates to a fuel feeding pipe connected to a fuel tank of an automobile, having a first feed oil pipe extending from an oil filler port, a second feed oil pipe projecting from a fuel tank, and a tightening belt for connecting the first and second feed oil pipes together and then tightening up the same, comprising the first feed oil pipe provides with an outer fitting pipe at a rear end part thereof, the second feed oil pipe provides with an inner fitting portion at a front end part thereof, the inner fitting portion provides with a low-temperature resisting seal ring and an ozone resisting seal ring fitted therearound in the mentioned order from a front open end thereof, and whereby the outer fitting pipe is fitted around the seal ring-fitted inner fitting portion, the feed oil pipes are then combined together firmly in one body by tightening with the tightening belt in an engaged region of at least a fitting quantity of the feed oil pipes.

The outer fitting pipe may be formed by extending the rear end portion of the first feed oil pipe. The inner fitting portion may also be formed by connecting a separate member to the front end portion of the second feed oil pipe. Further, the inner fitting portion may be provided on the rear end portion of the first feed oil pipe at the same time of the outer fitting pipe provided to the front end portion of the second feed oil pipe.

The fuel feeding pipe according to the present invention is formed by fitting the outer fitting pipe connected to the first feed oil pipe around the inner fitting portion of the second feed oil pipe. In this fuel feeding pipe, the outer fitting pipe is tightened with respect to the inner fitting portion by the tightening belt, and hermeticity of the fuel feeding pipe is improved by inserting seal rings between the outer fitting pipe and the inner fitting portion, thereby restraining the permeation of the fuel through the wall of the of the fuel feeding pipe to the outside thereof. The structure of connecting of the first feed oil pipe and second feed oil pipe by fitting one into the other can remove the pipes easily. At the same time, a slip-off of the outer fitting pipe from the inner fitting portion can be prevented owing to the friction of the seal rings occurring between the outer fitting pipe and the inner fitting portion in an engaged state. The seal rings may be fitted in corresponding ring fitting grooves provided in the inner fitting portion. The depth of each of the ring fitting grooves is set smaller than the thickness of each of the seal rings.

The hermeticity of the fuel feeding pipe is attained by isolating the interior and exterior thereof from each other by the seal rings. This indicates that the hermeticity of the fuel feeding pipe is depended upon the number of such isolated portions, i.e., in proportion to the number of the seal rings. When the material for the seal rings is selected properly, a stable hermeticity of the fuel feeding pipe adaptable to a changed environment can be obtained. Therefore, the fuel feeding pipe according to the present invention uses a fluororubber seal ring having ozone resistance mounted on the part of the inner fitting portion which is locating at far away from a front open end thereof, i.e. locating at closest position touching to the outside air of the fuel feeding pipe in the engaged region of the pipes. Further, conversely, a NBR seal ring having low-temperature resistance is mounted on the part of the inner fitting portion which is locating at close to a front open end thereof, i.e., locating at closest position touching to the inside space of the fuel feeding pipe in the engaged region of the pipes. A larger number of seal rings may be used, as long as that each of a fluororubber and a NBR seal rings have been located in the mentioned order.

The inner fitting portion, the outer fitting pipe and the tightening belt are brought into close contact with each other by a tightening force of the tightening belt positioned with covering the first and the second feed oil pipes, and thereby the mutually connected condition in the engaged region of the pipe can be maintained. In order to attain a more stable connected condition, it is preferable to develop the structural close contact of these three parts with one another. To be concrete, the inner fitting portion, the outer fitting pipe and the tightening belt are provided with an inner fitting tapering section, an outer fitting tapering section and a tightening tapering section, which have a similar cross-sectional shape, respectively. It is preferable that the outer fitting pipe is tightened against the inner fitting portion by the tightening belt with utilizing the tapering sections brought into surface contact with one another. In this case, when an angle of inclination of these tapering sections is set to a friction angle, an excellent slip-off preventing effect can be displayed.

The tightening belt may be formed by a ring spring using spring steel. This tightening belt is set on the outer feed oil pipe by bolting the opposed flanges of the belt. In order to obtain the above-mentioned slip-off preventing effect more reliably, the present invention provides a stepped annular portion on the outer fitting pipe or the inner fitting portion and a slip-off preventing annular portion on the tightening belt, so that the slip-off preventing annular portion are engaged with the stepped annular portion. Owing to a mutual effect of the slip-off preventing annular portion and tapering sections, the loosening and displacement of the tightening belt due to the vibrations of an automobile are prevented, and a more reliable hermeticity of the fuel feeding pipe according to the present invention is thereby secured. Since the loosening and displacement of the tightening belt also cause ignition by fuel leakage, it is important the slip-off preventing effect of the tightening belt as an important security component.

Further, the provision of the displacement preventing structure on the tightening belt leads to the reliable determination of installing positions of each parts in the assembling process. It contributes to the attainment of a high assembling operation efficiency.

Furthermore, this also means that it is hard that the tightening belt loosened during replacement operation of a feed oil pipe or a fuel tank slips off from the outer fitting pipe or the inner fitting portion. It becomes the higher efficiency of carrying put the maintenance operation.

When a slip-off preventing annular portion in one is provided on the tightening belt, the slip-off preventing annular portion may be deformed to obstruct the diametrical contraction of the tightening belt during tightening the tightening belt with respect to the outer fitting pipe. Therefore, there is the possibility that the tightening of the belt becomes insufficient. Under the circumstances, a plurality of slits are preferably provided in this slip-off preventing annular portion. As a result, the spaces between the slits are narrowed without deforming the slip-off preventing annular portion during a belt tightening operation smoothly, so that the belt can be tightened easily and reliably on the outer fitting pipe.

DETAILED DESCRIPTION OF THE INVENTION

Preferred embodiments of the present invention will now be described with reference to the drawings.

Figure 1:
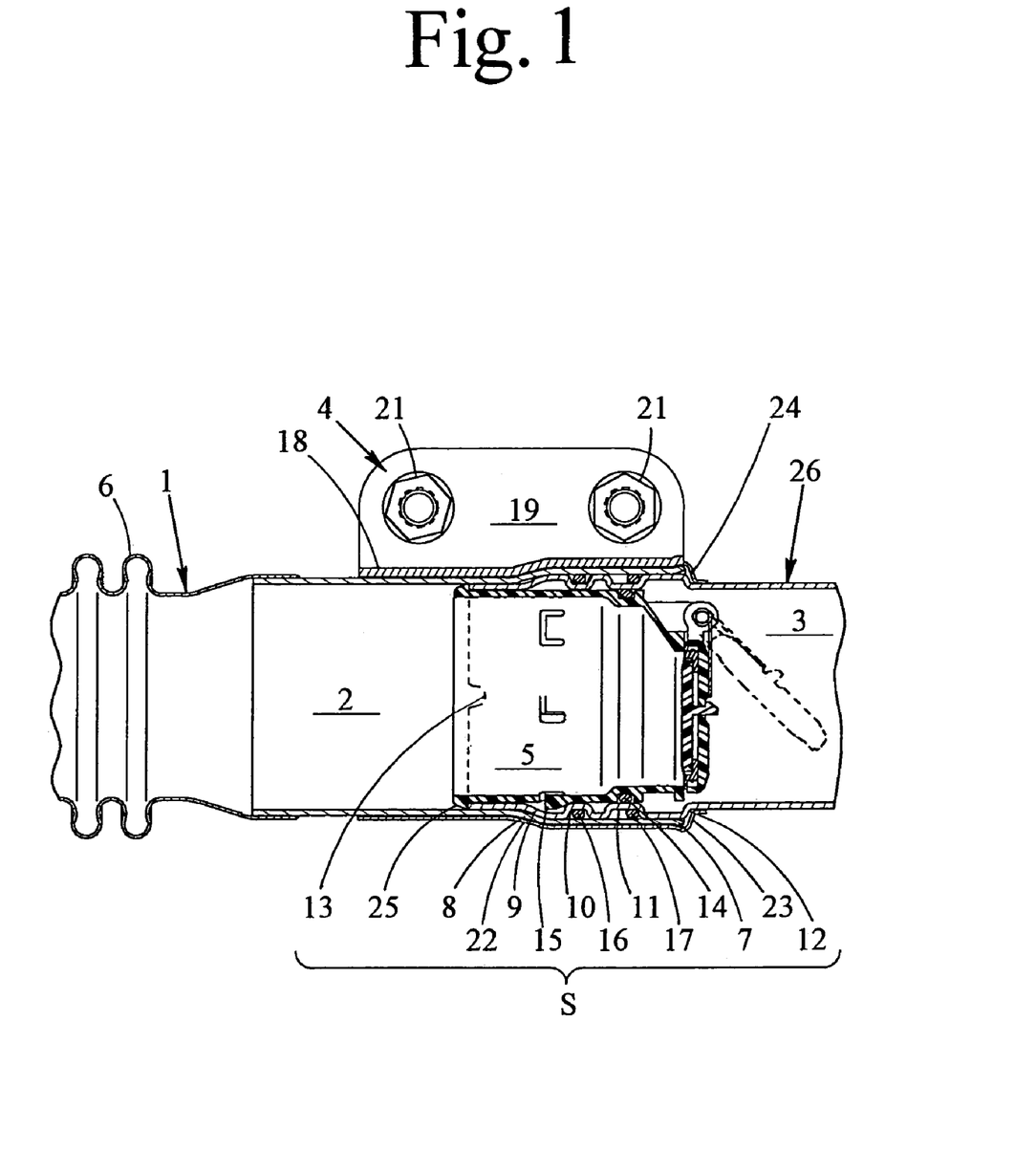
FIG. 1 is an axial sectional view showing one example of the fuel feeding pipe in an assembled condition according to the present invention.
Figure 2:
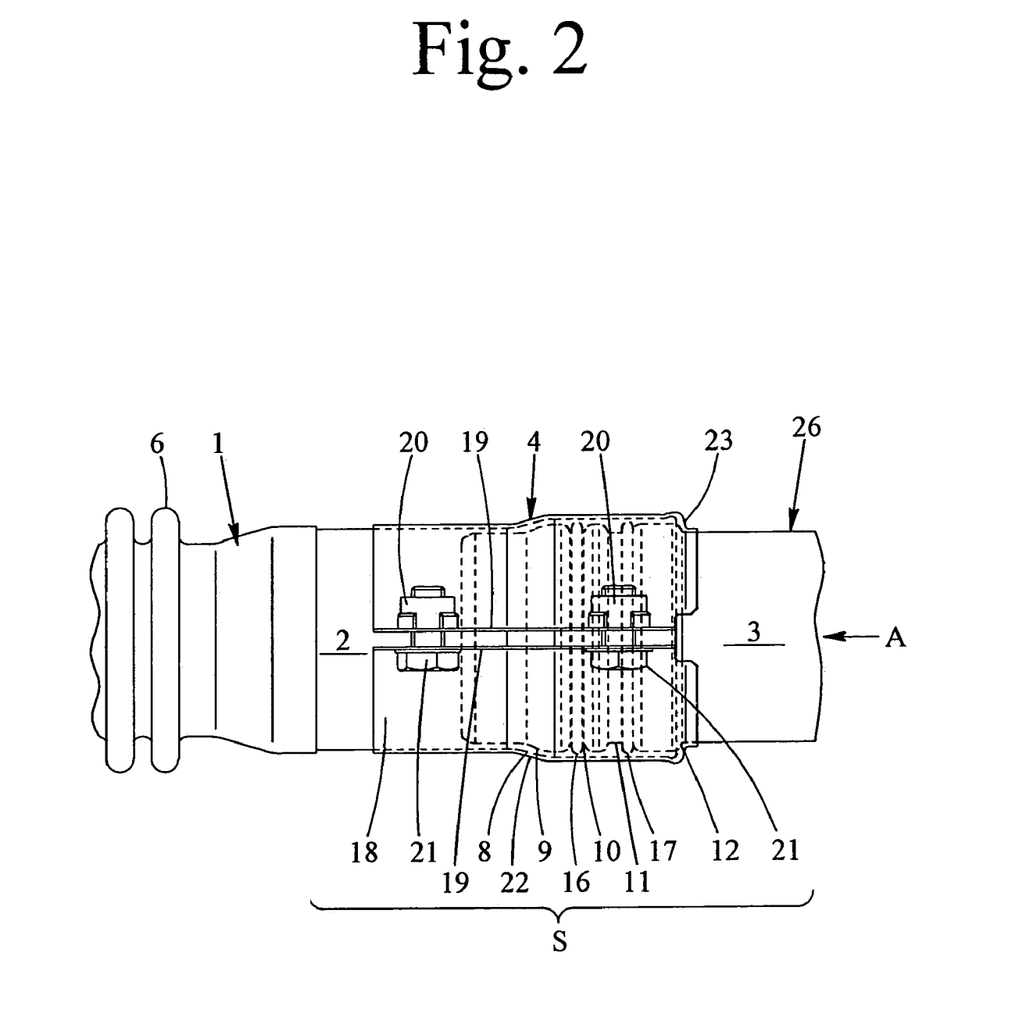
FIG. 2 is a plan view of the fuel feeding pipe shown in FIG. 1.

A fuel feeding pipe in this embodiment is formed as shown in FIG. 1 onward, by connecting an independently made outer fitting pipe 2 to a rear end of a first feed oil pipe 1, providing an inner fitting portion 3 on a front end portion of a second feed oil pipe 26 projecting from a fuel tank (not illustrated), engaging the outer fitting pipe 2 and inner fitting portion 3 with each other, and tightening the outer fitting pipe 2 in an engaged region S by a tightening belt 4 from the outside thereof.

Figure 7:
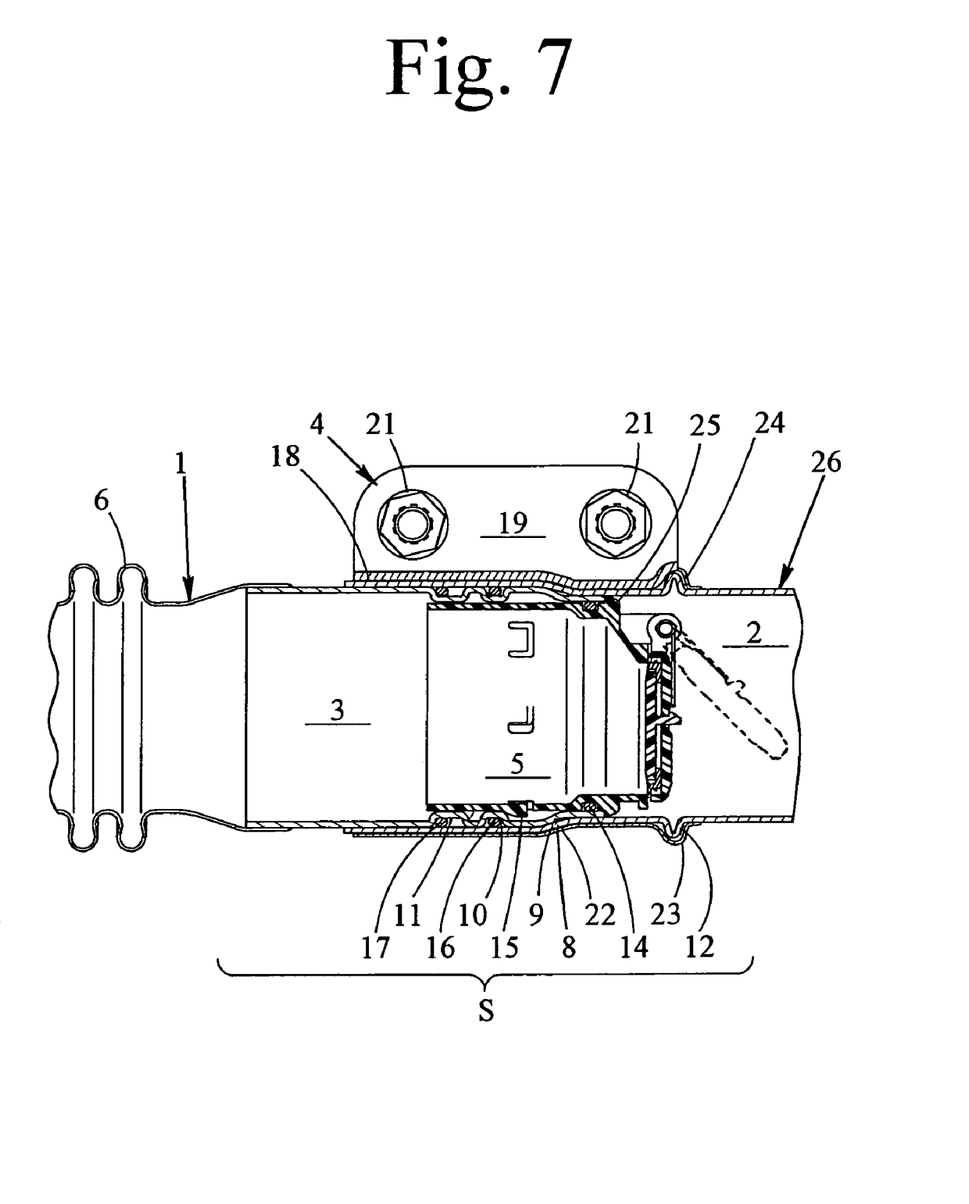
FIG. 7 is an axial sectional view showing another example of the fuel feeding pipe corresponding to FIG. 1.

It is free to assign either the outer fitting pipe 2 or the inner fitting portion to the first feed oil pipe 1, or second feed oil pipe 26. Thus, the engaging relation between these parts may be set reversely with respect to that between such parts in this embodiment, as shown in FIG. 7. However, since a check valve 5 is provided in the fuel feeding pipe in this embodiment, the inner fitting portion 3 is preferably engaged with the second feed oil pipe 26 projecting from the fuel tank.

Figure 4:
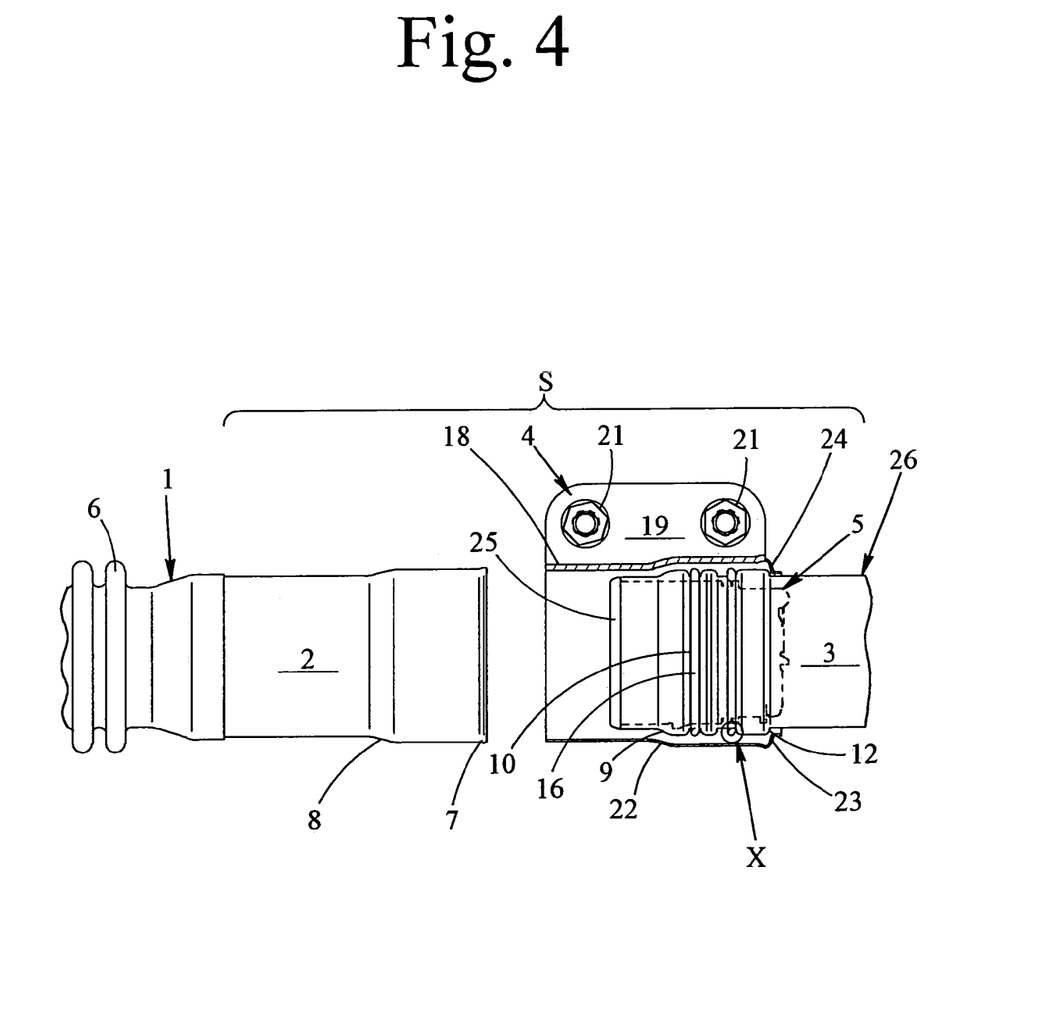
FIG. 4 is an axial sectional view showing an example in a separated condition of the fuel feeding pipe in an assembled condition.
Figure 5:
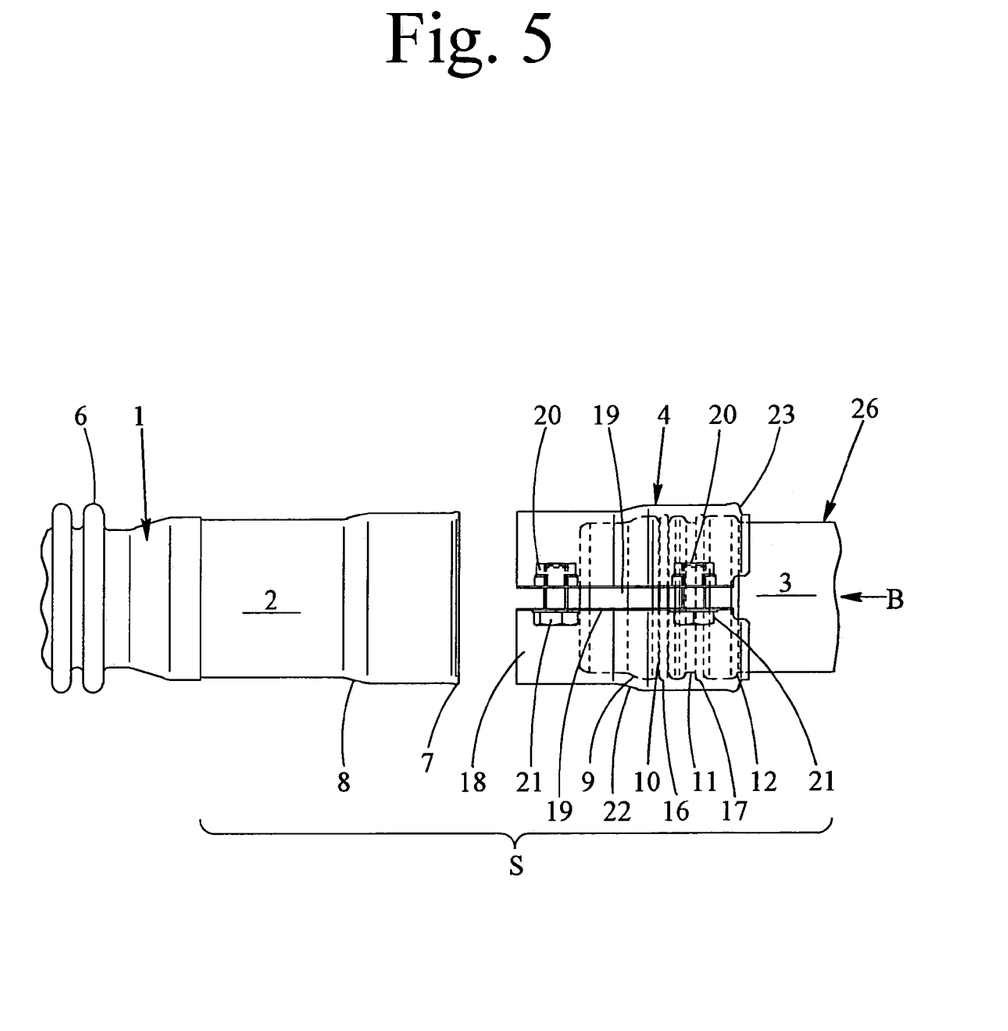
FIG. 5 is a plan view showing the same fuel feeding pipe in a separated condition in FIG. 4.
Figure 6:
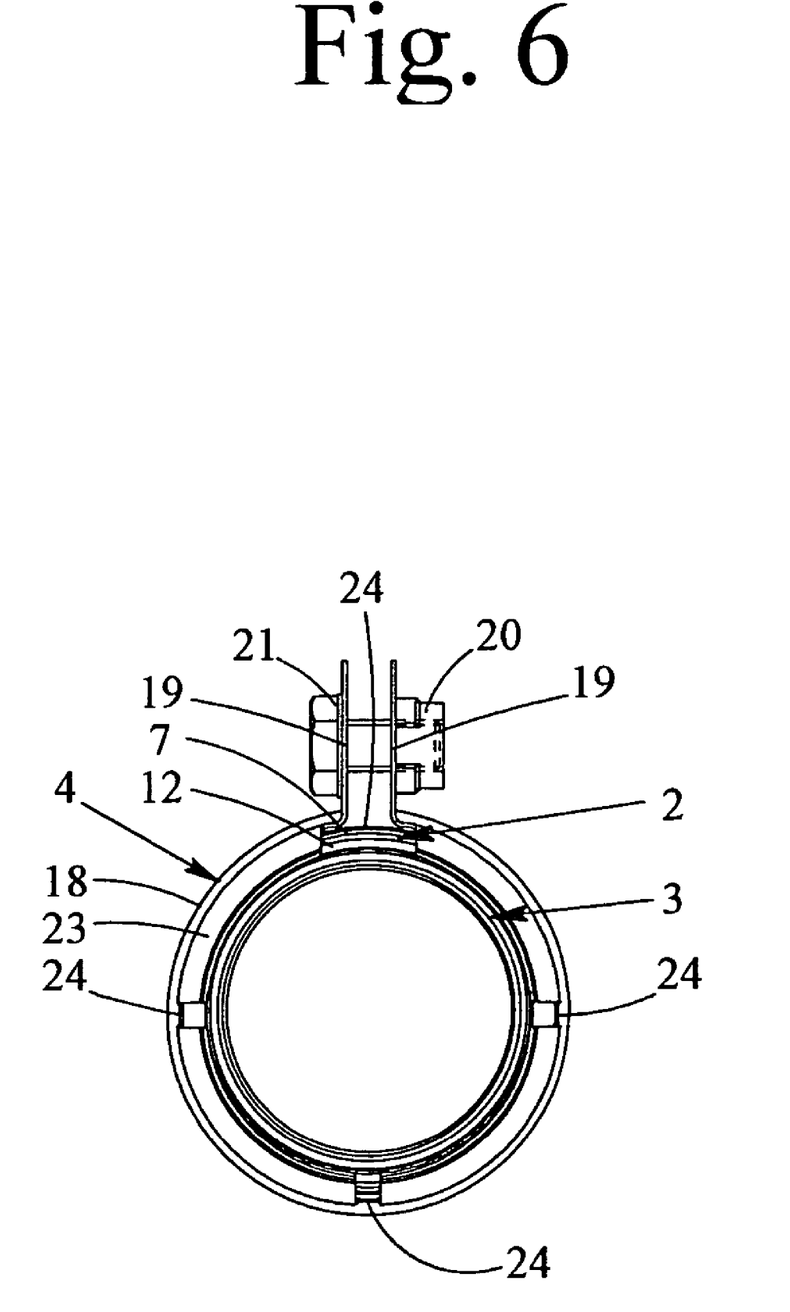
FIG. 6 is a cross-sectional view (an illustration of a check valve is omitted) of the same fuel feeding pipe taken in the direction of an arrow B in FIG. 5.

The first feed oil pipe 1 is made of a cross-sectionally circular pipe of a metal (for example, SUS steel), and a flexibility is given to this pipe by providing a bellows portion 6, which is molded a part of the pipe to a bellows-like shape. The outer fitting pipe 2 is a cross-sectionally circular pipe of a metal (for example, SUS steel) similar to the first feed oil pipe 1, engaged with a rear edge of the bellows portion, and combined together firmly by welding or soldering. The outer fitting pipe 2 in this embodiment is provided as shown in FIGS. 4 and 5 with a camberred peripheral edge portion 7 which is radially outwardly displaced at a fuel tank-side open end portion thereof. In addition, an outer fitting tapering section 8 is provided at a substantially intermediate part of the first feed oil pipe.

Since the outer fitting pipe 2 does not need to be separated from the first feed oil pipe 1, the outer fitting pipe may be integrally connected thereto. The first feed oil pipe 1 and the outer fitting pipe 2 may rather be welded together so as to secure a high hermeticity when the outer fitting pipe is integrally joined to the first feed oil pipe 1.

The second feed oil pipe 26 is a cross-sectionally circular pipe of a metal (for example, SUS steel), and fixed to an opening (not illustrated) of the fuel tank by welding, soldering, seam welding or various other known fixing means, so that the second feed oil pipe is projecting from the fuel tank. The inner fitting portion 3 does not need to be separated either from the second feed oil pipe 26. The inner fitting portion 3 may be molded integrally on the open end portion of the second feed oil pipe 26, or may be connected inseparably to the second oil pipe.

The inner fitting portion 3 of this embodiment is provided with an inner fitting tapering section 9, an inner ring fitting groove 10, an outer ring fitting groove 11 and a stepped annular portion 12 in the mentioned order from the front open end thereof (from the left side to the right side of FIG. 1) as seen in FIGS. 1, 4 and 5. The inner fitting tapering section 9 is an inclined surface similar to the outer fitting tapering section 8. These two tapering sections contact in surface of each other to cause a sticking effect generated, so that an engagement of these two tapering sections is strengthened. In this embodiment, an angle of inclination of these two tapering sections may be set to a friction angle determined by the materials used. Moreover, a position in which the two tapering sections are formed has a function of determining the quantity of engagement of the inner fitting portion and outer fitting pipe with each other.

In this embodiment, the check valve 5 is installed in the interior of the inner fitting portion with engaging to a notch 13 (refer to FIG. 1) provided in a front open end section of the inner fitting portion 3. An inner seal ring 14 is fitted firmly on the check valve 5, and brought into pressure contact with a bottom rear surface of the outer ring fitting groove 11. Thereby a necessary and sufficient hermeticity together with the positional stability of the fitted check valve can be obtained. The check valve 5 is provided with a snap claw 15 formed by cutting off a cylindrical portion thereof, and the snap claw is fitted in an interior space formed between the inner fitting tapering section 9 and inner ring fitting groove 10. A circumferential rib 25 provided on the valve body is engaged with a front open edge of the inner fitting portion 3. These fitting structure of the valve body determines quantity of the fitting of the check valve 5 into the inner fitting portion 3 in assembly process.

Figure 8:
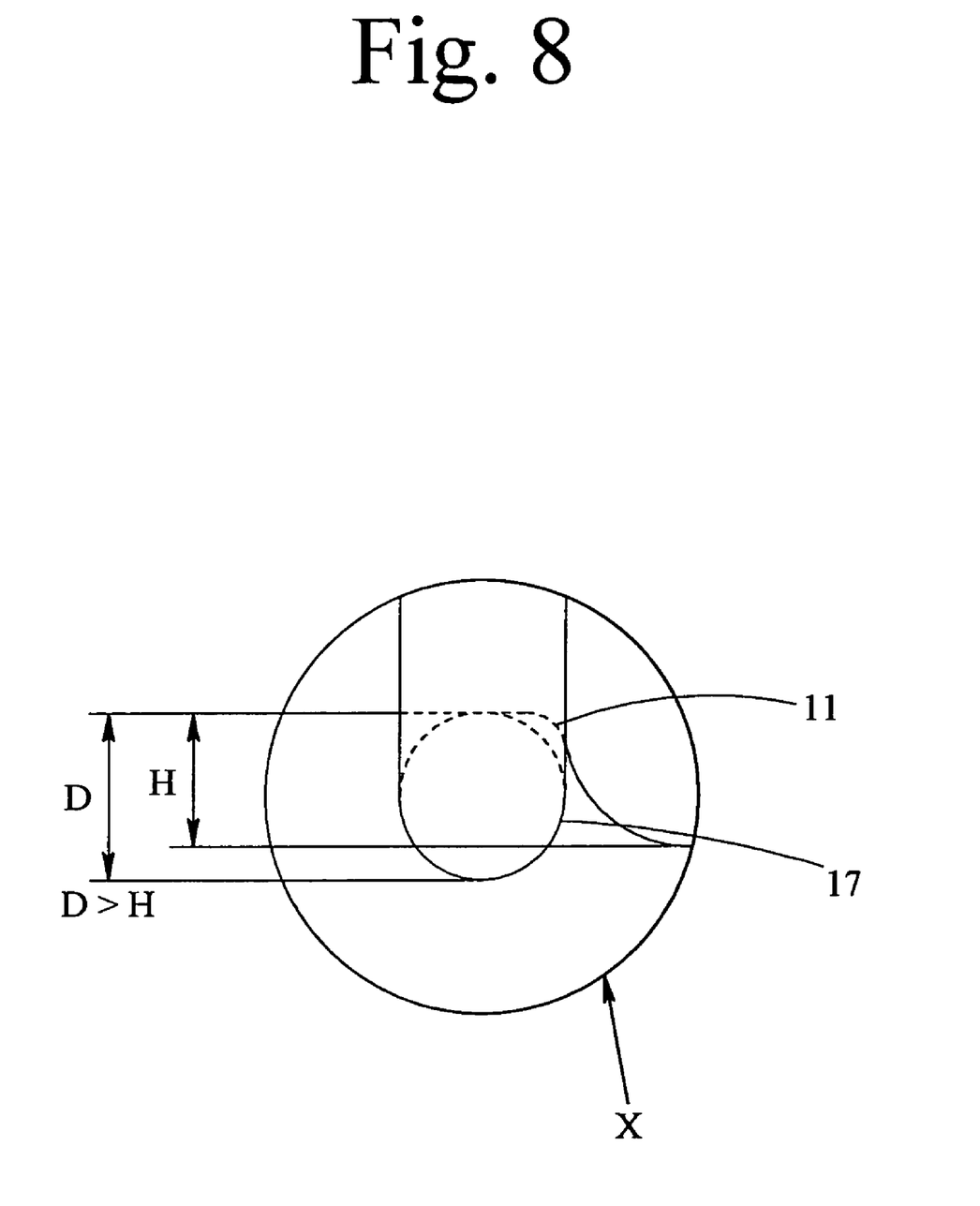
FIG. 8 is an enlarged sectional view of a portion enclosed with a circle X in FIG. 4, showing around an outer ring fitting groove.

The inner fitting portion 3 is provided with an inner ring fitting groove 10 and an outer ring fitting groove 11 in the mentioned order from the side of a front open end portion thereof. A NBR seal ring 16 is fitted in the inner ring fitting groove 10, and a fluororubber seal ring 17 fitted in the outer ring fitting groove 11. The inner and outer ring fitting grooves 10, 11 may be formed to the same sizes. In this embodiment, a diameter D in cross section of each of the seal rings 16, 17 is set larger than the depth H of the inner and outer ring fitting grooves 10 and 11 as seen in FIG. 8. As a result, when the outer fitting pipe 2 and the inner fitting portion 3 are engaged with each other, these rings 16, 17 are brought into pressure contact with an inner wall surface of the outer fitting pipe 2. Further, in this embodiment, in order to form a pressure contact margin of the inner seal ring 14 which is mounted on the check valve 5 for fitting into the inner fitting portion 3, only a bottom surface of the outer ring fitting groove 11 is widened.

In this embodiment, the fuel feeding pipe constructed by two seal rings 16, 17 fitting in the fitting grooves of the inner fitting portion is adopted. In a case that three seal rings are used, for example, (a) seal rings should be arranged in order from the side of the front open end of the inner fitting portion that a NBR seal ring, another NBR seal ring and a fluororubber seal ring, or (b) that a NBR seal ring, a fluororubber seal ring and another fluororubber seal ring. The hermeticity of the fuel feeding pipe can be improved by using both a NBR seal ring 16 and a fluororubber seal ring 17 which have different properties, and providing the fluororubber seal ring 17 in the fitting groove located farthest away from the front open end section of the inner fitting portion and the NBR seal ring 16 in the fitting groove located closest thereto.

The tightening belt 4 is made of a substantially cylindrical metal ring spring having a pair of tightening flanges 19, 19 opposed to each other at both end portions thereof. Welding nuts 20 are fixed to one of the tightening flanges 19, 19. A belt body 18 can be reduced or enlarged diameter thereof utilizing by bringing the tightening flanges 19, 19 close to each other or separating them from each other in accordance with a quantity of screwing of the tightening bolts 21 with the welding nuts 20. When the tightening belt 4 is made of spring steel (for example, SUS steel), the loosening of the tightening bolts 21 can be minimized owing to an opposing effect of the tightening flanges 19, 19 based on the restoring force of the spring steel. This enables spring washers for preventing loosening of the tightening bolts 21 to be omitted, and it brings reduction of the number of members.

When a plurality of tightening bolts 21 and welding nuts 20 are provided respectively as in this embodiment, for example, two paris of bolts and nuts arranged at the front and rear end portions of the flanges in the axial direction of the tightening belt, the tightening force spreads out the whole of the belt body 18, so that the engaged region of the outer fitting pipe 2 and the inner fitting portion 3 can be tightened uniformly. Additionally, the belt body 18 in this embodiment includes a tightening tapering section 22 formed at the middle portion of the belt body in cross-sectional shape similar to that of the outer fitting tapering section 8 and the inner fitting tapering section 9, and a slip-off preventing annular portion 23 formed in the circumferential edge of the belt body locating on the side of the fuel tank.

Figure 3:
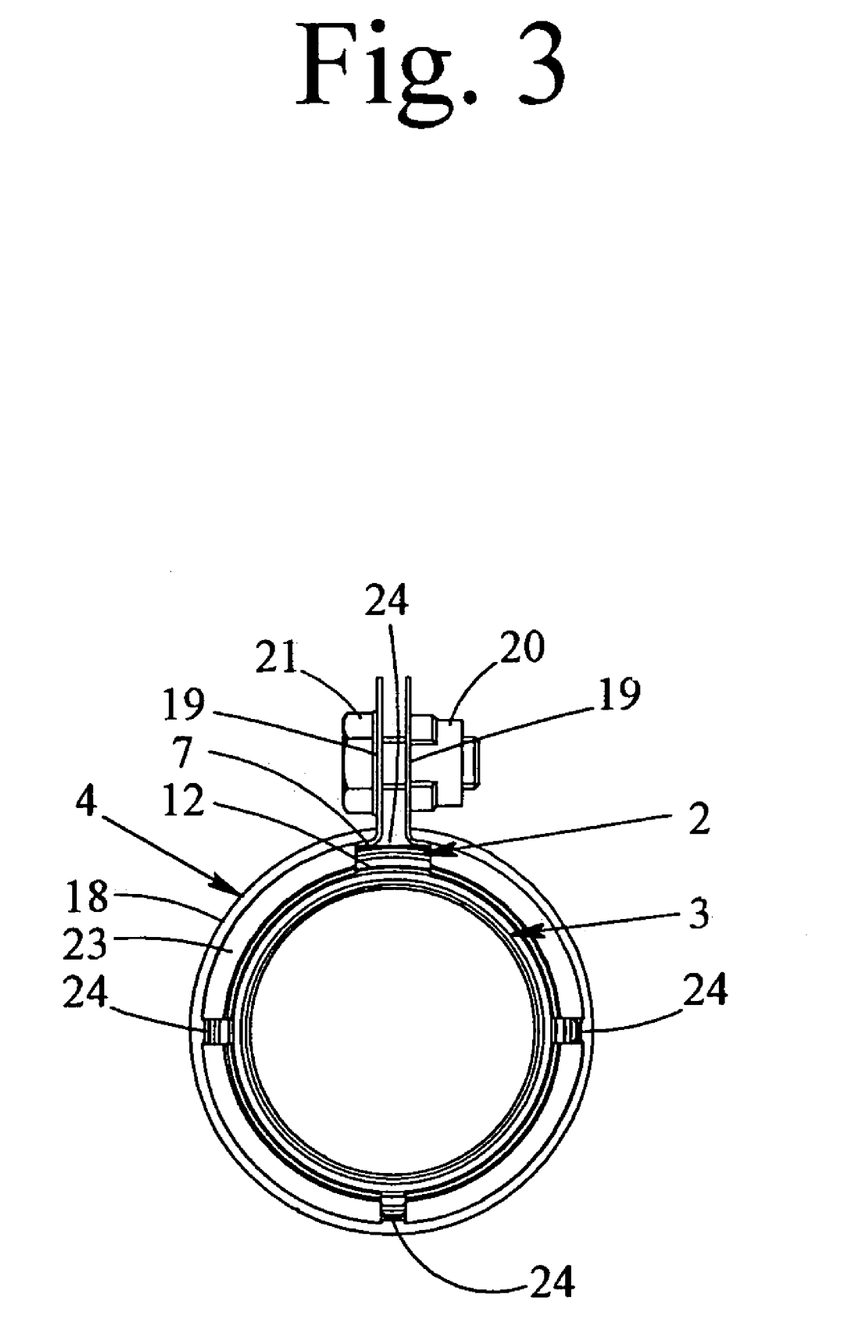
FIG. 3 is a cross-sectional view (an illustration of a check valve is omitted) of the same fuel feeding pipe taken in the direction of an arrow A in FIG. 2.

The slip-off preventing annular portion 23 is engaged with the stepped annular portion 12 formed on the inner fitting portion 3. The diametral reduction of the tightening belt obtained by coming the tightening flanges 19, 19 closer to each other while screwing the bolts also works as a force to close the fitting portion of the first feed oil pipe and the second feed oil pipe together leaning on each other with utilizing the opposed inclinations of the slip-off preventing annular portion 23 and the tightning tapering section 22. This structure has a function for fixing the tightening belt in a predetermined position. Accordingly, it can be achieved to prevent the loosening or displacement of the tightening belt caused by vibrations of the automobile, impact imparted thereto, or the like. At the same time, it can be achieved to even predetermine the positioning of the tightening belt. Moreover, in this embodiment, the mutual positional relation between the outer fitting pipe 2, the inner fitting pipe 3 and the tightening belt 4 is determined univocally by engaging the slip-off preventing annular portion 23 with the camberred peripheral edge portion 7 and the stepped annular portion 12. The slip-off preventing annular portion 23 in this embodiment is formed as seen in FIG. 3, by folding a rear end portion of the belt body 18 radially inward. This slip-off preventing annular portion 23 is provided with a plurality of slits 24 at intervals of 90 degrees so as not to obstruct reduction or enlargement of diameter of the belt body 18 by tightening thereof.

As described above, the present invention can provide the fuel feeding pipe obtained only by tightening the fitted outer fitting pipe 2 and the inner fitting portion 3 with the tightening belt 4 integrally. It is also maintained the connecting state of the outer fitting pipe 2 and the inner fitting portion 3 being fitted only by utilizing friction therebetween. Moreover, the present invention can improve the connection strength of the fuel feeding pipe utilizing by a sticking effect generated with contacting surfaces of the outer fitting tapering section 8, the inner fitting tapering section 9 and the tightening tapering section 22. In the same time, however, the outer fitting pipe 2 and the inner fitting portion 3 can be separated easily when the tightening belt 4 is loosened by unscrewing the tightening bolts 21 and welding nuts 20. Thus, the fuel feeding pipe of the present invention can achieve not only that a structure capable of connecting and disconnecting the parts, but also the strong connection and high hermeticity thereof caused by a tightening of the tightening belt 4, an effect of sticking surfaces of the tapering sections 8, 9 and 22 each other, a slip-off preventing effect of the tapering sections and the slip-off preventing annular portion 23 engaged with the stepped annular portion 12, and by a presence of a plurality of the seal rings 16 and 17.

Although the outer fitting pipe 2 is joined to the first feed oil pipe 1 with the inner fitting portion 3 joined to the second feed oil pipe 26 in the above-described embodiment, it is also applicable that a fuel feeding pipe in which an inner fitting portion 3 is joined to a first feed oil pipe 1 with an outer fitting pipe 2 joined to a second feed oil pipe 26 as shown in FIG. 7. In this embodiment, the fuel feeding pipe has a structure that the outer fitting pipe 2 projecting from the fuel tank is fitted over the inner fitting portion 3 fixed to the first feed oil pipe 1. Accordingly, a check valve 5 is fitted into the inner fitting portion 3 in direction to the first feed oil pipe. Further, the fitting location of the outer fitting pipe 2 and inner fitting portion 3 against the first and the second feed oil pipe is contrary as compared with location in the previously described embodiment. Accordingly, the inner and the outer ring fitting grooves 10 and 11 are also located in contrary as compared with location in the previously described embodiment. However, a presence of two seal rings 16 and 17, and, an effect by sticking surfaces of the tapering sections 8, 9 and 22 will not be described because of the same manner as in the previously described embodiment.

The present invention can provide a fuel feeding pipe having (1) a high hermeticity as a basic performance sufficient to minimize the permeation of a fuel throughout the wall of the pipe, (2) capability of being removed easily, (3) flexibility to response in various kinds of environments, and (4) stability of fit thereof without influences by vibration or impact occurred on an automobile.

The high hermeticity of the fuel feeding pipe is led by the fitting structure of the outer fitting pipe and the inner fitting portion while the seal rings mounted on the outer fitting pipe and the inner fitting porition are compressed. The structure utilizing the tightening belt to be tightened or loosened brings the easiness of removing the fuel feeding pipe.

The capability of the fuel feeding pipe of securing high hermeticity thereof in various kinds of environments is effected by using different kinds of a material for the seal rings. To be concrete, this is an effect of providing a fluororubber seal ring with a high ozone resistance to be located at close to a front open end of the inner fitting portion, and a NBR seal ring of a high low-temperature resistance to be located at far away from a front open end of the inner fitting portion.

Moreover, the inner fitting portion, the outer fitting pipe and the tightening belt are each provided with the inner fitting tapering section, the outer fitting tapering section and the tightening tapering section which have a similar cross-sectional shape each other. The outer fitting pipe is tightened toward the inner fitting portion with these tapering sections brought into surface contact with each other. And, the slip-off preventing annular portion of the tightening belt is also engaged with the stepped annular portion provided on the inner fitting portion. As a result, a fuel feeding pipe being connected in stable can be obtained even when a vehicle vibrates or when an impact is imparted thereto. The contact surfaces of the tapering sections causes an effect of tightening the tapering sections firmly by the tightening belt and of raising the hermeticity of the fuel feeding pipe.

In addition, the present invention is provided with the slip-off preventing annular portion, which is to engage with the stepped annular portion provided on the outer fitting portion or the inner fitting portion, on the tightening belt. Therefore, even when the tightening belt is loosened, the outer fitting portion does not come off from the inner fitting portion. This also solves anxiety for missing of the tightening belt during replacement operation in which was a problem peculiar to the fuel feeding pipe of the present invention enabled to replace thereof or of the fuel tank, as well as a simple and a quick replacement operation are achieved.

As mentioned above, therefore, the present invention has solved four problems independently, and provides a fuel feeding pipe having an unprecedented excellent performance.

What is claimed is:

1. A fuel feeding pipe having a firmly combined unitary structure having a first feed oil pipe extending from an oil filler port, a second feed oil pipe projecting from a fuel tank, and a tightening belt for connecting and tightening the first and second feed oil pipes together, comprising:

an outer fitting pipe provided at a rear end portion of the first feed oil pipe, and an inner fitting portion provided at a front end part of the second feed oil pipe, having an inner fitting tapering section and at least two fitting grooves with the depth of which is smaller than a cross-sectional diameter of seal rings, which tapering section and grooves being provided on the inner fitting portion in the mentioned order from a front open end thereof, the seal rings including a low-temperature resisting seal ring provided in the fitting groove which is the closest to the front open end of the inner fitting portion, and an ozone resisting seal ring provided in the fitting groove which is the farthest away from the front open end of the fitting portion, the outer fitting pipe fitted to the inner fitting portion having an outer fitting tapering part in cross-sectional shape similar to that of the inner fitting tapering section so that the location of the outer fitting tapering part determines a fitting quantity of the feed oil pipes, the tightening belt having a tightening tapering portion in cross-sectional shape similar to that of the outer fitting tapering part so that the location of the tightening tapering portion determines the position thereof in which at least width of the belt covers the fitting quantity of the feed oil pipes, and whereby fitting the outer fitting pipe around the inner fitting pipe so that an outer fitting tapering part surface contacts an inner fitting tapering section surface, further contacting surface of the tightening tapering portion of the tightening belt onto the outside of the outer fitting tapering part surface being fitted, and tightening the tightening belt.

2. A fuel feeding pipe according to claim 1, wherein the tightening belt has a slip-off preventing annular portions formed by a plurality of slits which is engaged with a stepped annular portion provided on the inner fitting portion.

3. A fuel feeding pipe according to claim 1, wherein the tightening belt has a slip-off preventing annular portion formed by a plurality of slits which is engaged with a cambered peripheral edge portion provided on the outer fitting pipe.

* * * * *